United States Patent [19]
Uchiyama

[11] Patent Number: 6,005,298
[45] Date of Patent: Dec. 21, 1999

[54] CLAMP STRUCTURE FOR CORD

[75] Inventor: Norio Uchiyama, Tokyo, Japan

[73] Assignee: Niles Parts Co., Ltd., Japan

[21] Appl. No.: 08/884,406

[22] Filed: Jun. 27, 1997

[30] Foreign Application Priority Data

Jun. 28, 1996 [JP] Japan .................................. 8-186933

[51] Int. Cl.$^6$ .................................................. F16L 3/08
[52] U.S. Cl. ........................................ 307/10.1; 248/74.3
[58] Field of Search .................................. 307/9.1, 10.1;
248/74.3, 65; 200/61.27, 61.54, 335, 4;
29/739, 753, 754, 761, 795

[56] References Cited

U.S. PATENT DOCUMENTS

| | | | |
|---|---|---|---|
| 3,149,808 | 9/1964 | Weckesser | 248/74.3 |
| 5,598,994 | 2/1997 | Olewinski et al. | 248/74.3 |
| 5,820,083 | 10/1998 | Geiger | 248/74.3 |

FOREIGN PATENT DOCUMENTS 58-165934  11/1983  Japan .

Primary Examiner—Richard T. Elms
Attorney, Agent, or Firm—Rader, Fishman & Grauer; Ronald P. Kananen

[57] ABSTRACT

A clamp structure for a cord that improves workability during clamping a cord with using a strip band. The clamp structure includes a polarity board 1, and a connector portion 2 projectingly provided on a side surface of the polarity board 1. A corner 3 is formed by the polarity board 1 and the connector portion 2. A cord 4 is provided for transmitting a signal from a rotary switch portion 5a, and a cover 8 is provided for covering a circuit board 7 and the polarity board 1. A strip band 9 formed of resin in a strip form is provided having a lock portion 9a at one end. An engaging portion 10 is formed integral with a side surface of the connector portion 2, which is engaged with the inserted strip band 9. The cover 8 has a guide portion 11 triangular in section provided at a location adjacent to the engaging portion 10 so that the tip end of the strip band 9 inserted through the engaging portion 10 is guided along the guide surface 11 to an outside of the polarity board 1.

10 Claims, 3 Drawing Sheets

CLAMP STRUCTURE FOR CORD

BACKGROUND OF THE INVENTION

1. Field of the Invention

This invention relates to a clamp structure for a cord that is drawn from a switch, such as a lever switch or the like, in a combination switch for an automotive vehicle.

2. Description of the Related Art

A conventional clamp structure is disclosed, for example, in Japanese Utility Model Examined Publication No. Hei 2-44437. In this known structure, the cord extending from a lever end and the cord extending from a polarity board are held by a metallic cord clamper screwed on the polarity board so that, when connecting a connector at a tip end of the cord to another device, the cord even if pulled will not be drawn out of a portion soldered to a switch contact.

In the above conventional structure, there is no problem if there is a space to provide a cord clamper on the polarity board. However, when it is attached to a narrow location, for example in a periphery of a steering column like a combination switch for an automotive vehicle, it becomes impossible to install a cord clamper due to the relations to other parts. Accordingly, as shown in FIG. 5, the cord 4 has to be held at a narrow corner 3. In such a case, fixing is done by using a strip band 9 on a side surface of a case 1. However, there has been a problem that, when passing the strip band 9 to an engaging portion 14, the tip end of the strip band is placed into abutment against an opposed wall with respect to an inserting direction, and it cannot be drawn to an outside, thereby substantially worsening the workability.

SUMMARY OF THE INVENTION

The present invention has been made in view of the problems with the conventional clamp structure described above, and it is the object to improve workability where a cord is clamped by using a strip band.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a clamp structure for a cord is provided, comprising: a cord for transmitting signals from a switch; a strip band for holding the cord; an engaging portion formed in a switch case to engage the strip band; and a guide surface provided at a location, adjacent to the engaging portion, to guide a tip end of the strip band to an outward direction.

Also, the invention is further characterized in that the guide surface is formed in a member adjacent to the switch case.

Further, the invention is characterized in that the strip band inserted in the engaging portion is in a curved-plane state so as to be held onto the case by its own elasticity.

The invention is also characterized in that the switch is a combination switch for an automotive vehicle.

BRIEF DESCRIPTION OF THE DRAWINGS

The present invention will become more clearly appreciated as the disclosure of the invention is made with reference to the accompanying drawings.

DETAILED DESCRIPTION OF THE INVENTION

Figure 1:
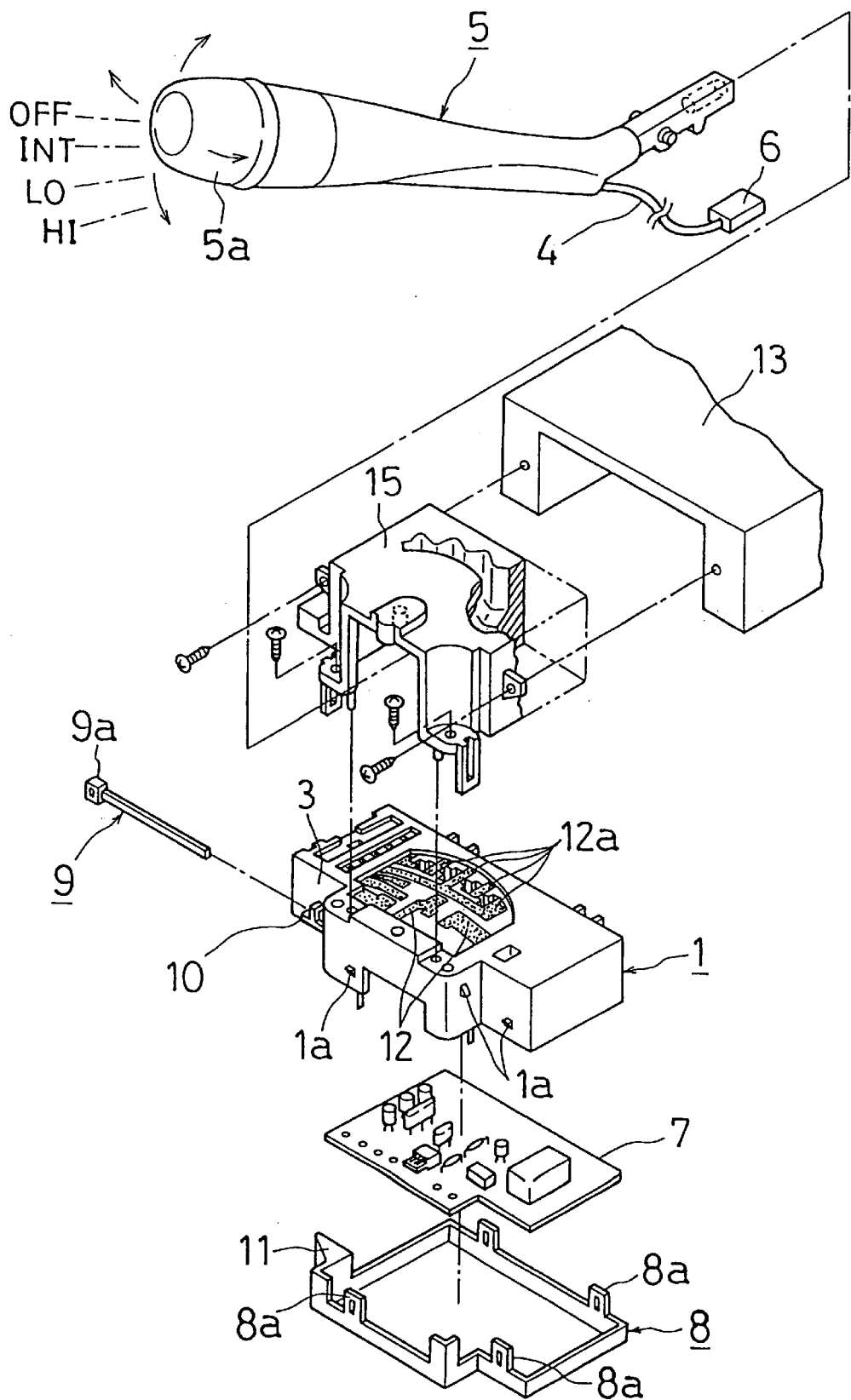
FIG. 1 is an exploded perspective view showing one embodiment of the present invention.

Explanation will be made hereinbelow based on an example to which an embodiment of the present invention is applied to a wiper switch in a combination switch for an automotive vehicle as shown in the drawings. In FIG. 1, a polarity board 1 is provided as a switch case that cooperates with another switch case 15 to form a box body. A connector portion 2 is projectingly provided integral with a side surface of the polarity board 1 so that the polarity board 1 and the connector portion 2 form a corner portion 3. A cord 4 extends from a base portion of a lever 5 for transmitting a signal from a rotary switch portion 5a provided at a tip of the lever 5. A connector 6 is attached to an end of the cord 4, which is connected to another unit (not shown). A circuit board 7 is provided for an intermittent wiper unit, which is mounted on the polarity board 1. A cover 8 is provided for covering together with the circuit board 7, the polarity board 1, which corresponds to a member adjacent to the switch case. A strip band 9 has a lock portion 9a at one end thereof and is formed of a resin in a strip form.

The polarity board 1 is insert-formed with a terminal 12 of a conductive metal sheet. The terminal 12 forms a fixed contact 12a for a switch that is opened and closed upon turning the lever 5, and has a connection terminal 12b projecting to the inside of the connector portion 2, forming a connection terminal 12b. The polarity board 1 is hoop-formed wherein continuously-blanked terminals 12 are resin-formed, followed by cutting away unwanted portions 12c, 12d.

Figure 2:
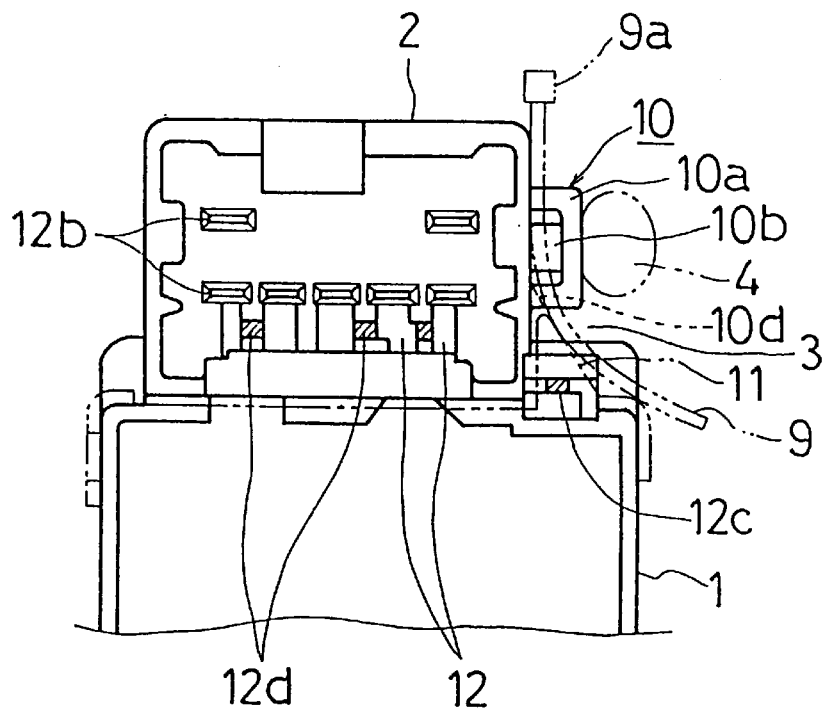
FIG. 2 is an essential-part plan view of the same embodiment.
Figure 3:
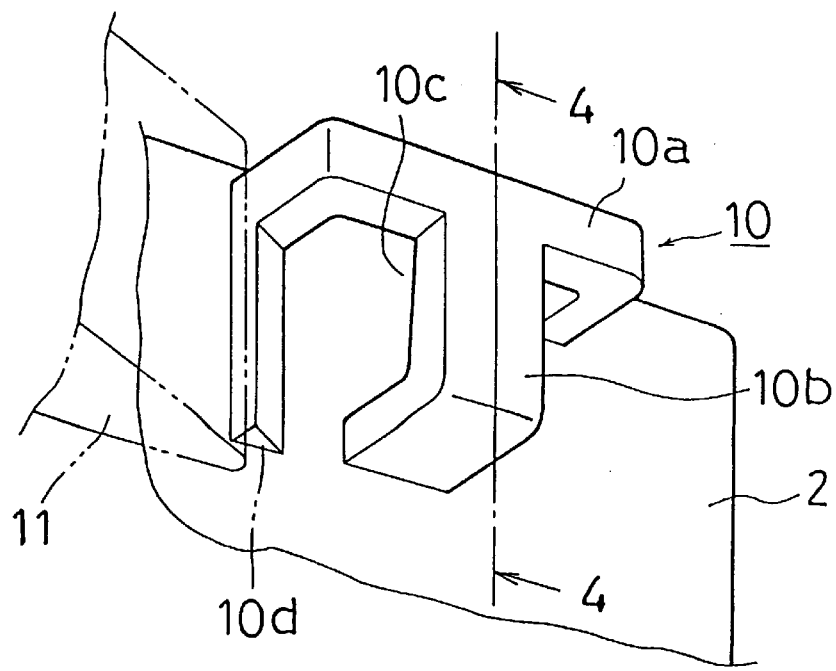
FIG. 3 is an essential-part perspective view of the same embodiment.
Figure 4:
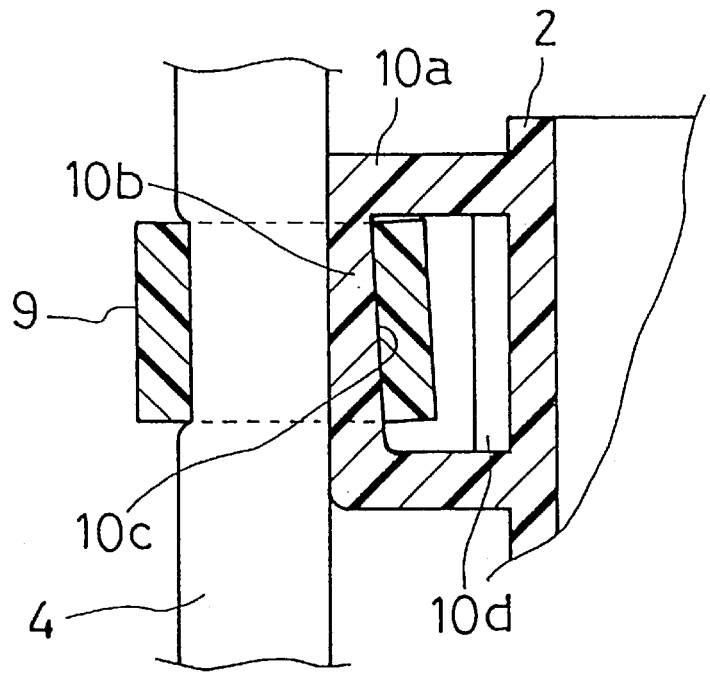
FIG. 4 is a sectional view taken along line A—A in FIG. 3.
Figure 5:
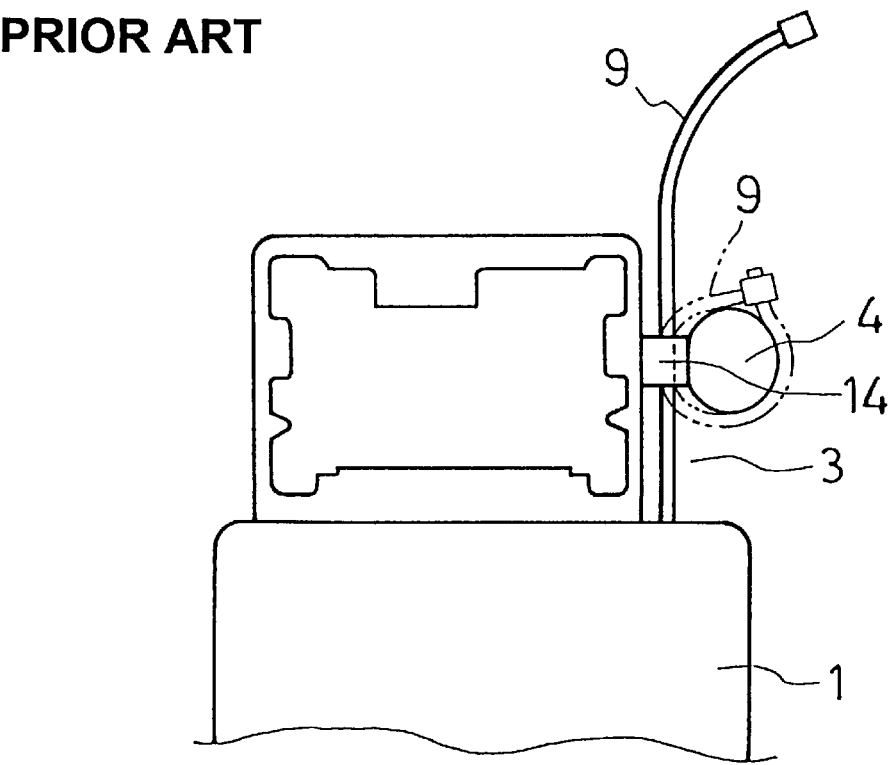
FIG. 5 is a essential-part plan view showing a conventional problem.

An engaging portion 10 is formed integral with the side surface of the connector portion 2, through which the strip band 9 is inserted for engagement. This engaging portion 10, as shown in FIGS. 2 through 4, is constituted by a support portion 10a of a flattened-arch form in section, and an arm portion 10b extending from a central portion of the support portion 10a to the downward in an L-shape form so that separation of dies is possible in only a vertical direction during forming the polarity board 1. The arm portion 10b is formed in a taper surface 10c such that an inner surface thereof becomes thinner as the upper is approached from the lower, so that it has a thinnest portion at a connecting portion to the support portion 10a. Furthermore, in the present embodiment, as stated later, a guide surface 11 is formed in the cover 8 as a separate member from the polarity board 1. The tip of the guide surface 11 cannot be formed in contact with the arm 10b of the engaging portion 10 due to the presence of the support portion 10a so that an auxiliary guide surface 10d for guiding the tip end of the strip band 9 is formed in an underside surface of the support portion 10a on a guide surface 11 side.

The cover 8 is for protecting the circuit board 7 for the intermittent wiper unit, and has a plurality of engaging pieces 8a on sides of a sheet-formed resin member for engagement with engaging claws 1a formed on the side surfaces of the polarity board 1. Furthermore, the cover 8 has the guide portion 11 of a triangle in section provided at a location adjacent to the engaging portion 10 formed in the connector portion 2 so that the tip end of the inserted strip band 9 through the engaging portion 10 is guided along the guide surface 11 to the outward of the polarity board 1.

In the structure of the first embodiment constructed in this manner, the cover 8 is attached to the polarity board 1, and then the strip band 9 is inserted through the engaging portion 10 of the polarity board 1. Thereafter, the cord 4 is drawn to a position of the engaging portion 10, and finally the strip band 9 is engaged at its tip by the lock portion 9a at a terminal end thereof, thereby ending clamp operation for the cord 4. In this case, when the strip band 9 is inserted through the engaging portion 10, the tip end of the strip band 9 is drawn outward through the auxiliary guide surface 10d of the engaging portion 10 and the guide surface 11 provided in the cover 8. Therefore, there is no fear that the strip band 9 at its tip end is brought into abutment against an opposed surface in an inserting direction, resulting in impossibility of being drawn outward as conventionally encountered. Therefore operation is smoothly performed. Moreover, the strip band 9 drawn along the guide surface 11 assumes in a curved state as shown by the two-dot chain line in FIG. 2, so that the strip band becomes a state that it is urged against the polarity board 1 and the engaging portion 10 by a force of restoring to a straight line form due to its own elasticity. Accordingly, the strip band 9 will not fall out if it is not held by the hand.

When the cord 4 is clamped to the engaging portion 10, since the arm 10b of the engaging portion 10 is formed such that it becomes thinner as the upper is approached from the lower, the tightening of the strip band 9 causes the strip band 9 together with the cord 4 to slide on the taper surface 10c, to thereby be clamped at the connecting portion to the support portion 10a, i.e., at the upper end of the arm 10b, with accuracy and firmness.

Incidentally, in the above embodiment, the guide surface 11 is formed in the cover 8. This is because, after resin-forming the polarity board 1, a tool for cutting unwanted portions 12c of the terminal 12 is passed through an adjacent portion to the engaging portion 10 of the polarity board 1, and accordingly, if the guide surface at this position is formed integral with the polarity board 1, there occurs interference with the tool. Therefore, it is formed in such a separate member as the cover 8. Where there is no hindrance to the working or the like after such forming, the guide surface 11 may be formed directly on the polarity board 1. The guide surface may otherwise be formed on a mating member to which the polarity board 1 is attached, such as the other switch case 15 and the housing 13 for the combination switch. Although in the above embodiment the guide surface 11 was formed in a flat surface, it is possible, without limiting to this, to select an appropriate shape such as a curved plane. Furthermore, the location applied is not limited to the combination switch, and application is possible to cord clamping for a variety of other switches.

As described above, the present invention is structured by: a cord for transmitting signals from a switch; a strip band for holding the cord; an engaging portion formed in a switch case to engage the strip band; and a guide surface provided at a location adjacent to the engaging portion to guide a tip end of the strip band to an outward direction. As a result, when the strip band is inserted into the engaging portion, the tip end of the strip band is automatically guided along the guide surface to the outside, thereby smoothening the tying operation for the cord.

Also, in the present invention, the guide surface is formed in a member adjacent to the switch case. After forming the switch case, even if there is a necessity of passing a working tool through a guide-surface forming point for blanking a insert-formed terminal or the like due to a necessity of blanking the insert-formed terminal or the like, a guide surface is formed in a member assembled later so that tying operation is smoothly performed without influencing on the above-mentioned post-working, enhancing freedom in clamp positional setting while securing workability.

Further, in the present invention, the strip band inserted in the engaging portion is in a curved-plane state so as to be held onto the case by its own elasticity. By merely inserting the strip band into the engaging portion, the strip band is put into a state of being temporarily sustained by the case. Therefore, there is no necessity of holding the cord with one hand to insert the tip end of the strip band into a lock portion for fastening it, while preventing the strip band from falling out with the other hand. Thus, workability is further improved.

In the present invention, the present structure can be applied to a combination switch for an automotive vehicle which is at a location extremely close in positional relation to other parts such as a column cover where the cord is required to be held positively within a narrow site. Thus, significant effects are to be attained.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A clamp structure for holding a cord in a corner of a switch case, comprising:
   a cord for transmitting signals from a switch;
   a strip band for holding said cord;
   an engaging portion formed in a first wall of a switch case to engage said strip band, said engaging portion being arranged to permit said strip band to be inserted therethrough in a first direction toward an opposed wall of said switch case, said first wall and said opposed wall together forming a corner of said switch case; and
   a guide surface provided at a location between said engaging portion and said opposed wall, said guide surface being arranged to guide a tip end of said strip band to an outward direction away from said opposed wall as said strip band is inserted through said engaging portion in said first direction.

2. The clamp structure for a cord according to claim 1, wherein said guide surface is formed in a member adjacent to said switch case.

3. The clamp structure for a cord according to claim 2, wherein said strip band inserted in said engaging portion is in a curved-plane state so as to be held onto said case by its own elasticity.

4. The clamp structure for a cord according to claim 3, wherein said switch is a combination switch for an automotive vehicle.

5. The clamp structure for a cord according to claim 2, wherein said switch is a combination switch for an automotive vehicle.

6. The clamp structure for a cord according to claim 1, wherein said strip band inserted in said engaging portion is in a curved-plane state so as to be held onto said case by its own elasticity.

7. The clamp structure for a cord according to claim 1, wherein said switch is a combination switch for an automotive vehicle.

8. A combination switch for an automotive vehicle, comprising:

- a switch case having first and second portions that intersect and form a corner portion;
- a cord extending from a switch lever for transmitting signals from said switch lever into said switch case;
- a strip band for holding said cord;
- an engaging portion formed integral with a first wall of said first portion of said switch case to engage said strip band, said engaging portion being arranged to permit said strip band to be inserted therethrough in a first direction toward an opposed wall of said second portion of said switch case, said first wall and said opposed wall together forming said corner portion of said switch case; and
- a guide surface disposed between said engaging portion and said opposed wall, said guide surface being arranged to guide a tip end of said strip band away from said opposed wall as said strip band is inserted through said engaging portion in said first direction.

9. The combination switch according to claim 8, wherein said engaging portion comprises a support portion having a flattened-arch shape in section, and an L-shaped arm portion extending between a central portion of the support portion and said first wall.

10. The combination switch according to claim 8, wherein said guide surface is formed integral with a cover that attaches to said switch case and is separate from said engaging portion and said switch case.

* * * * *